United States Patent [19]
Petit

[11] 3,934,519
[45] Jan. 27, 1976

[54] CORE STRUCTURE, ASSEMBLY AND PROCESS

[76] Inventor: Didier Marceau Petit, Route du Vieux Moulin, Vincy Reuil Magny, France, 02340

[22] Filed: Apr. 8, 1974

[21] Appl. No.: 458,554

[52] U.S. Cl. .................. 108/150; 108/153; 248/165
[51] Int. Cl.² .......................................... A47B 13/02
[58] Field of Search ........ 248/188.7, 163, 165, 431; 108/156, 153, 157, 150

[56] References Cited
UNITED STATES PATENTS

| | | | |
|---|---|---|---|
| 2,055,761 | 9/1936 | Gerschefski | 248/165 |
| 3,078,063 | 2/1963 | Frankl | 248/188.7 |
| 3,312,438 | 4/1967 | Goetz et al. | 248/165 |
| 3,366,079 | 1/1968 | Koransky et al. | 248/431 |
| 3,443,782 | 5/1969 | Fields et al. | 248/188.7 |
| 3,643,608 | 2/1972 | DeCesaris | 248/431 |
| 3,801,054 | 4/1974 | Glowacki | 248/188.7 |

*Primary Examiner*—Roy D. Frazier
*Assistant Examiner*—Darrell Marquette
*Attorney, Agent, or Firm*—Johnston, Keil, Thompson & Shurtleff

[57] ABSTRACT

A core structure is provided for assembling a plurality of tubular or rod-like supporting members for a table or other articles.

7 Claims, 8 Drawing Figures

CORE STRUCTURE, ASSEMBLY AND PROCESS

It is known to make various assemblies, for example, furniture, while utilizing as a part of the furniture an assembly of tubes which makes it possible to obtain unusual and satisfactory esthetic effects. This is true in particular for tables, the supporting structure of which advantageously consists of an assembly of curved tubes, all of which are identical and are assembled together and disposed in a regular fashion around the same axis. The same is true for diverse objects such as coat stands, lamps and the like. One of the difficulties encountered in the manufacture of such assemblies of tubes is the necessity for assembling the tubes with respect to each other in definitely fixed positions so that solidarity is perfectly assured. It is well known to carry out such operations by welding but in this case the operation of assembling the tubes is relatively long and troublesome and the presence of welds on the tubes does not permit obtaining a satisfactory finish. Moreover, when the assembly is effected by welding, the resultant assembly cannot be taken apart which in certain cases causes an inconvenience particularly if it is desired to remove one of the tubes of the assembly for repair.

The present invention has for an object a process of assembling tubes permitting, on the one hand, perfect positioning of the tubes with respect to one another, and, on the other hand, assuring a solid fixation of the tubes with one another while giving a satisfactory appearing finish, and finally, permitting demounting the assembly for replacement of one or more tubes, if desired. In addition to the satisfactory nature of the assembly obtained in accordance with the process of the invention with respect to the finish, it should also be mentioned that the cost of making such an assembly is relatively small and the result is accomplished without the use of skilled manual labor.

The present invention has for an object a process of assembly of at least two tubes where the assembly zone of the finished assembly provides for rotation around the same axis characterized by the fact that there is disposed on the exterior side of each area of the tube to be assembled a tongue or lug projecting from the exterior of the tube; the said tongue or lug engages in slots or openings formed in the periphery of an assembly core, said slots communicating with a hollow portion in the central part of the assembly housing so that the lugs or tongues of the tubes can be inserted through the openings to the central hollow portion of the core and locked in place by means of a locking piece which is fixed to the core.

In a preferred method of practicing the invention each lug or tongue is secured to the central part of the core by cooperation between a projection on the lug or tongue with an area bordering on the side of the core which surrounds the slot or opening where the lug or tongue has been introduced into the central hollow portion of the core and locking of the lugs or tongues is effected after the said operation; the locking piece is a plate which is brought to bear against all of the lugs or tongues when the said lugs or tongues have been positioned in the interior of the hollow central portion of the core, the securing of the plate to the core being obtained by means of a threaded bolt secured to the core which passes through the plate so that the plate is held in position by means of a nut screwed onto said bolt. The present invention also has for an object provision of a new industrial product comprising a core assembly which permits carrying out the assembly procedure as hereinafter defined, the said core being characterized by the fact that it comprises around its periphery at least as many openings as there are tubes to be assembled, the said openings communicating with the exterior approximately centrally of the hollow portion of the core, a means of fixation being provided in the interior of the hollow portion of the core to permit securing at least one locking piece to the core.

According to a preferred method of practicing the invention the core comprises exteriorly channels or grooves permitting the placement of tubes for assembly; the core comprises a symmetrical axis; the channels or grooves for positioning the tubes for assembly are disposed regularly around the axis of the core; a plane passing through the axis of symmetry of the core and the median line of the groove in the plane is an arc of a circle; the right section of a groove in the median plane of the core which is perpendicular to the axis of symmetry of said core is an arc of a circle; each groove comprises an elongated slot or opening which communicates with the central hollow portion of the core, the size of said slot or opening being slightly greater than the size of the lug or tongue fixed to each tube to be assembled; the length of each slot or elongated opening is of at least equal to the length of the lugs or tongues of the tubes to be assembled.

The present invention also has for an object a new industrial product which consists of an assembly of tubes obtained by the process hereinafter defined and/or utilizing an assembly core such as hereinafter defined, characterized by the fact that each of the tubes to be assembled is disposed along the periphery of the assembly core, the tongue or lug affixed to the exterior side of each tube to be assembled penetrates transversely into the opening or slot of the core to the central hollow portion of the core, the locking piece associated with the core assembly being disposed in the interior of the hollow central portion of the core and simultaneously locking all of the lugs or tongues of the tubes together and to the side of the core.

In another preferred way of practicing the invention, the assembly according to the invention comprises a core having an axis of symmetry according to which is disposed a threaded bolt, a locking piece being a plate which, by sliding on the threaded bolt, can be applied to all of the lugs or tongues of the tubes, the said plate being maintained in place against the lugs or tongues by a nut cooperating with the said threaded bolt; the core comprising exteriorly positioning grooves or channels for assembling the tubes, the grooves or channels having outlets in the form of openings through which the lugs or tongues penetrate into the central portion of the housing of the core; the central portion of the housing of the core containing zones approximately in the form of truncated cones on which occurs locking of the projecting parts formed on each of the lugs or tongues.

The present invention finally has for an object the production of a new industrial product consisting of a table comprising a top supported by a central pedestal characterized by the fact that the pedestal consists of an assembly such as that hereinafter defined.

The invention will be better understood but is not limited by the following description illustrated by way of example in conjunction with the accompanying drawings, of one mode of practicing the invention.

Figure 1:
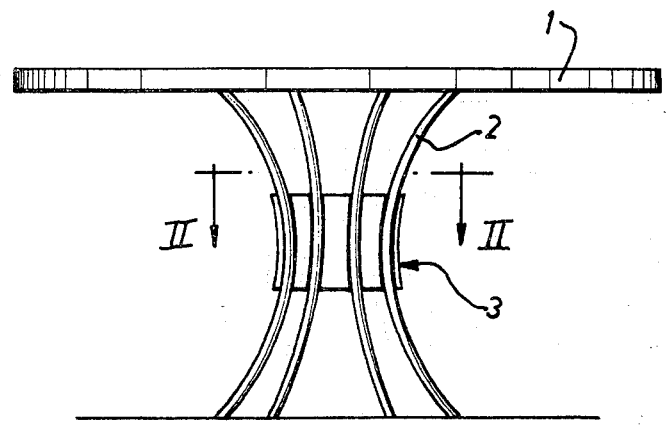
FIG. 1 represents, in elevation, a table according to the invention comprising a central pedestal formed from an assembly of tubes.
Figure 6:
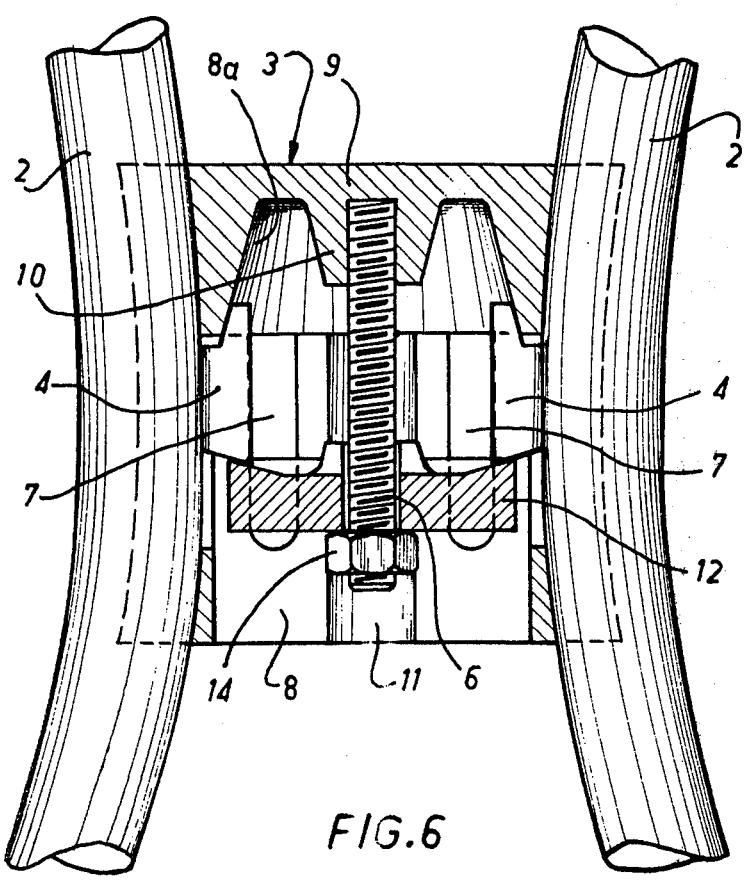
Figure 3:
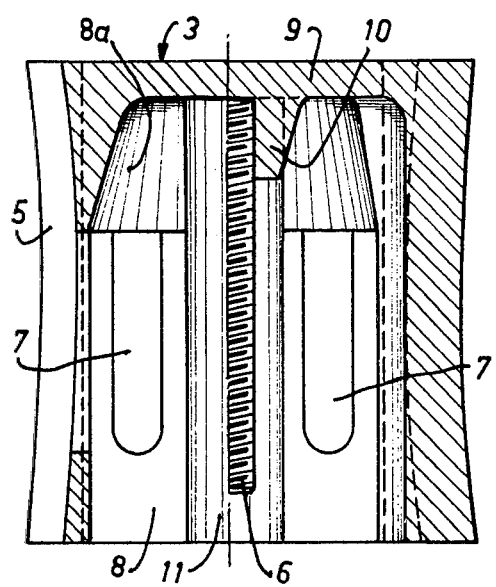
FIG. 3 represents a sectional view taken along the line III,III of FIG. 2.
Figures 4, 5:
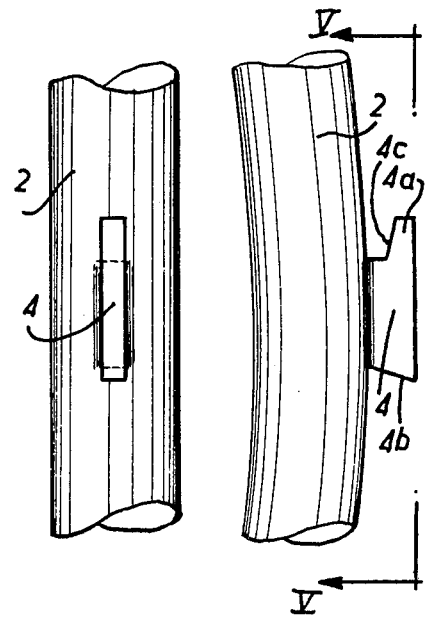
Figure 8:
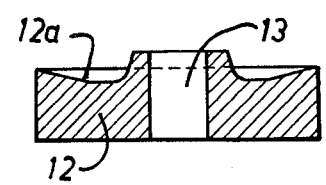
Figure 7:
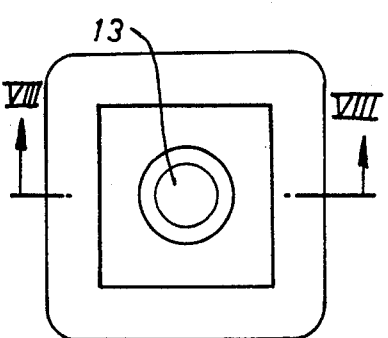
Figure 2:
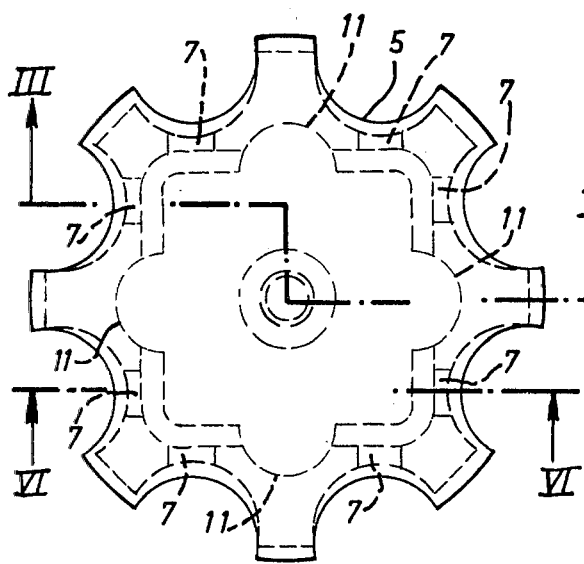
FIG. 2 represents a plan view, taken along the line II,II of FIG. 1, of an assembly core used for assembling the tubes of the pedestal of the table of FIG. 1, the said tubes not being shown.

FIG. 4, in elevation, illustrates the connecting zone of one of the assembly tubes attached to the core of FIGS. 2 and 3;

FIG. 5 represents a view taken along the line V,V of FIG. 4;

FIG. 6 represents a sectional view taken along the line VI,VI of FIG. 2, the tubes corresponding to the slots or openings in the assembly core being shown in the assembly position;

FIG. 7 represents a plan view of the clamping or locking plate which cooperates with the core of FIGS. 2 and 3; and 8 represents a section taken along the lines VIII,VIII VIII of FIG. 7.

Referring to the drawings, the top of the table 1 has a supporting structure consisting of an assembly of eight tubes 2. Each tube 2 has a circular section and is curved in such a way that its axis has a curvilinear form, the central part of the axis of each tube being curved approximately according to an arc of a circle. The eight tubes 2 are assembled in their central area by means of an assembly core 3; the core 3 has an axis of symmetry coinciding, when the table is completely assembled, with the axis of symmetry of the table. In the assembly zone with the core 3, each tube 2 comprises exteriorly a lug or tongue projecting on the tube.

Each tube 2 is curved in a manner such that its axis has the form of a curved plane. The lug or tongue 4 projects on the tube in the plane of the curve which forms the axis of the tube and contains in the upper part a projecting area 4a and in the lower part a face inclined toward the bottom 4b. The projecting area 4a is defined, adjacent the tube 2, by an inclined face 4c forming an angle of about 15° with the axis of tube 2 in the fastening zone of the lug or tongue 4.

The assembly core 3 comprises exteriorly eight channels or grooves 5 disposed regularly about 45° apart around the periphery. A threaded rod 6 is disposed at the axis of symmetry of core 3. The channels or grooves 5 are all identical and make 45° angles around the axis of the bolt 6. In the median of the plane of core 3 which is perpendicular to the axis of the bolt 6 each channel or groove 5 consists of a section of an arc of a circle of at least 180°; in a plane passing through the axis of the bolt 6 the channels or grooves 5 have a mean line corresponding approximately to the mean line of an arc of a circle of tubes 2 in the zone where they must be assembled with the core 3.

In each channel or groove 5 is an elongated opening or slot 7 which lengthwise is parallel to the axis of the bolt 6 and longer than the length of the lug or tongue 4; the size of openings 7 is greater than that of the size of lugs or tongues 4. The openings 7 communicate in each channel or groove 5 with the hollow central portion 8 formed in the interior of core 3; the hollow central portion 8 extends almost the entire height of core 3, opening exteriorly on its lower face and being closed by the portion 9 in the upper part of the core. The threaded bolt 6 is fixed by screwing it into an embossment 10 formed in the central area of the upper portion 9. The part 8a of the hollow portion 8 which forms a passageway in the portion 9 is approximately the form of a truncated pyramid whose faces are inclined at approximately a 15° angle with respect to the axis of rod 6. In the zone where there is no pyramidal shape the hollow central portion 8 constitutes approximately a right prism having a square base whose angles are rounded; the median line of each face of this prismatic zone has arranged parallel to the axis of the bolt 6 cylindrical grooves 11 having a right section in the form of an arc of a circle; the openings 7 are disposed on each face of the right prism formed by the hollow portion 8 in a symmetrical manner with respect to grooves 11.

In order to accomplish the assembling according to the invention, a tube 2 is assembled with the core 3 in a manner such that the lug or tongue 4 is face to face with opening 7 and the lug 4 is forced into opening 7 until the tube 2 is applied to the base of the corresponding channel 5. The tube 2 is then slid along with respect to the core 3 in a manner such that the face 4c of the lug 4 comes to rest against the pyramidal part 8a which assures locking of the tube on the core 3. In the same way all of the tubes 2 are assembled with respect to the core 3 until the eight tubes have been placed in their eight channels 5. Then the locking plate 12 having a form corresponding to the section of the prismatic part of hollow portion 8 is applied to the threaded bolt 6. The plate 12 has in its central zone a bore 13 which permits the passage of the threaded bolt 6 and its face 12a, which opposes the inclined faces 4b of lugs 4, comprises on its periphery a slope corresponding to the slope of the edges 4b; as a result, the locking plate 12 must come to rest simultaneously on all of the ridges or edges 4b of all of the lugs 4, thus insuring the locking without play of the lugs 4 with respect to core 3. The locking position of the plate 12 is maintained by means of a nut 14 which is screwed on the threaded bolt 10. When the nut 14 is tightened, the eight tubes 2 are slideably fixed to core 3 and their assembly in a relatively predetermined position is perfectly assured without any play.

It will be recognized that the assembly herein described does not necessitate the use of any specialized manual labor and is de-mountable if it becomes necessary to replace one of the tubes 2. The tubes 2 and the core 3 permit an assembly finishing operation designed to give an esthetic appearance, the kind of finishing operation that can be accomplished on individual elements and not on the complete supporting structure of the table which presents a certain economic advantage.

It will be understood that the manner of practicing the invention herein described is not limited to the specific description and may be modified in certain respects without departing from the spirit of the invention.

The invention is hereby claimed as follows:

1. An assembly comprising a core structure and a plurality of tubular or rod-like supporting members for a table or other article, said core structure comprising a core member having a top, a bottom, a side connecting the top and bottom, and a hollow interior portion open at the bottom, a plurality of external grooves in the side extending generally in a top to bottom direction, a side opening in each of said external side grooves communicating with said hollow portion, the hollow portion of said core member having inclined side surfaces sloping inwardly and upwardly from an area adjacent the upper ends of the interior of said side openings toward the top of the hollow portion of said core member, said tubular or rod-like supporting members each comprising a lug projecting from and affixed thereto, each of said lugs having an inwardly and upwardly inclined surface complemental to the inclined side surface of the hollow interior of said core member, said lugs being inserted in said side openings of said core member with said inwardly and upwardly inclined surfaces of said lugs in engagement with said inclined side surface of the hollow interior portion of said core member, and with the sides of said tubular or rod-like supporting members positioned in said external grooves each of said lugs on said supporting members also having a downwardly and inwardly sloped surface, clamping means comprising a plate, the upper edges of which have a sloping surface complemental to the downwardly and inwardly sloping surfaces of said lugs, and means for holding said plate in locked position with the sloping surfaces of said plate clamped against the downwardly and inwardly sloping surfaces of said lugs.

2. An assembly as claimed in claim 1 wherein said external side grooves have an arcuate cross section.

3. An assembly as claimed in claim 1 wherein the upper part of said hollow portion of said core member has the general shape of a truncated cone.

4. An assembly as claimed in claim 1 wherein the lower part of said hollow portion of said core member has a generally rectangular cross section.

5. An assembly as claimed in claim 1 in which said external side grooves of said core are curved from top to bottom and said tubular or rod-like supporting members are complementally curved.

6. An assembly as claimed in claim 1 comprising a table having a table top supported by the ends of said tubular or rod-like supporting members which in turn are held in position by said core structure disposed intermediately between the ends of said supporting members.

7. An assembly as claimed in claim 1 in which said means for holding said plate in locked position comprises a threaded bolt fixed at one end to the central upper part of said core member passing downwardly to the lower part of the hollow portion of said core member through an aperture in said plate and secured to said plate by a nut.

* * * * *

UNITED STATES PATENT AND TRADEMARK OFFICE
CERTIFICATE OF CORRECTION

PATENT NO. : 3,934,519
DATED : January 27, 1976
INVENTOR(S) : DIDIER MARCEAU PETIT It is certified that error appears in the above–identified patent and that said Letters Patent are hereby corrected as shown below:

Column 3, line 23, before "8" insert --FIG.--.

*Signed and Sealed this*

Fourteenth *Day of* December 1976

[SEAL]

*Attest:*

RUTH C. MASON
*Attesting Officer*

C. MARSHALL DANN
*Commissioner of Patents and Trademarks*